Patented Nov. 13, 1928.

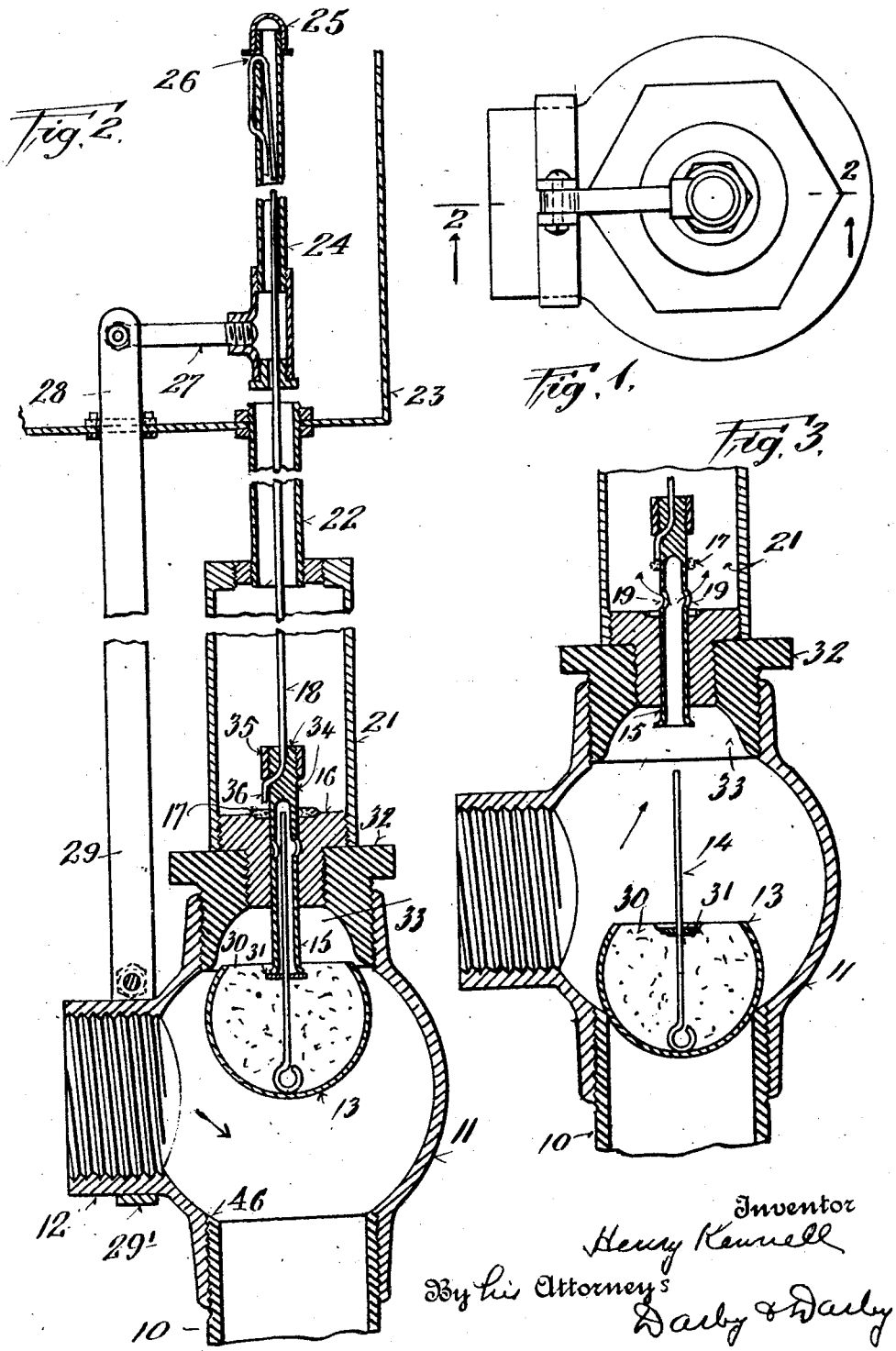

1,691,442

UNITED STATES PATENT OFFICE.

HENRY KENNELL, OF NEW YORK, N. Y.

TELLTALE POSITIVE AND AUTOMATIC GAS CUT-OFF VALVE.

Application filed November 28, 1925. Serial No. 71,940.

This invention relates to automatic gas cut-off valves, and includes means for positively dislocating the automatic cut-off means in case the same has failed to operate automatically in response to abnormal conditions. A further object of my invention includes the provision of a simple and efficient construction which automatically acts as a tell-tale or gas by-pass to indicate that the device has operated to cut off the gas supply. I further provide an assembled unit which is readily applied as a gas cut-off fixture.

Other objects will appear hereinafter, and I attain these objects by the construction illustrated in the accompanying drawing in which Fig. 1 is a plan view of a construction which embraces the principles of my invention.

Fig. 2 is a view in longitudinal section taken on the line 2—2 of Fig. 1, and

Fig. 3 is a view in longitudinal section of a portion of the valve after the said valve has been shut and the tell-tale device operated.

The same numerals refer to like parts throughout the several views.

It is a well known fact that an unchecked gas supply offers a source of great danger in case of fires. It is also well known that in case of fire it frequently happens that no means are at hand for quickly shutting off the flow of gas and an open gas pipe is then turned into a flaming torch, which can be overcome only with great difficulty or by shutting off the supply of gas. The gas cut-off must not only be positive and effective for cutting off the gas supply but it must be so located and constructed that it may be made to operate positively, and if necessary, when so operated, that fact should be easily ascertained. To this end I have conceived and constructed an automatic positive gas cut-off mechanism wherein I have also provided simple and effective means for indicating that the cut-off device has acted and that the gas supply pipe is effectively closed. To this end various means are available. As a practical application, however, and to illustrate my invention in a concrete case, I provide the gas supply pipe 10 with a valve body member 11. This valve body member is provided with a gas outlet 12 and a gas cut-off device 13 The cut-off device may assume any practical and simple construction, as a ball, or the like, having a guide stem 14, which fits into a guide and tell-tale tube 15 of particular construction so as to function also as means for indicating that the shut-off mechanism has operated and that the gas supply pipe is closed. This tube slidably fits and is normally held in a plug 16 by releasable means 17 as sealing wax or other similar means, which will permit ready release when the device is required to function. In the assembled position (see Fig. 2) the end of tube 15 is secured in the sealing wax or other releasable means 30 in ball 13, and a disk 31 is provided to insure positive disconnection and an open passage through the tube 15 so that the presence of the gas in the valve body member can be readily detected after the mechanism has operated and assumed the position indicated in Fig. 3, for example. In that case the tube 15 will serve as a by-pass for any gas that may be in the valve body. The tell-tale flow of gas would be through opening 19 in tube 15 and thence to (usually) an outside outlet box 23 through the connecting tubes 21 and 22, if the tube and outlet box are used.

Plug 16 is provided with a suitable coupling member 32 which is provided with a dome 33 for the ball and into which the tube 15 extends. For convenience of assembling the parts, the coupling member is threaded so that the tube 15 may be embedded in the releasable means 30 of ball 13. Tube 15 is then adjusted and secured by seal 17, and the assembly is ready for insertion in the valve body to assume substantially the position shown in Fig. 2. The upper end of tube 15 ends in head 34 having a screw cap 35 to engage and secure the end 36 of the operating cable 18.

Any suitable mechanism may be employed for breaking the seals 17 and 30 and thus positively dislodging the ball from the end of tube 15. As a practical construction I provide a handle 24 for adjustably gripping the cable 18 by a clamping member, or cap, 25, which engages the cable as it is passed through a hole 26 to be readily fastened to the proper length. The handle 24 is fastened to an arm 27 which is fulcrumed on a standard 28 in the outlet box 23. The standard may terminate in the box or it may be provided with an extension 29 for engaging the outlet gas pipe 12 by a band 29' to thus afford a firm support for the handle. If desired, box 23 and tubes 21 and 22 may be eliminated.

From the description thus far given the application and operation of my device is readily understood. The valve device is installed and permanently attached to a main gas supply pipe 10 at any suitable and safe position. The outlet box is located at a safe but accessible place and usually without the building or compartment to which the gas is supplied. If now a fire occurs within a house or compartment thus protected, there is no danger of gas explosion or gas fires as the device will under abnormal temperature conditions automatically cut off the gas supply. If, on the other hand, it becomes necessary to cut off the gas before the device operates automatically, as where the fire is at a distance from the cut-off valve, then will recourse be had to the positive cut-off mechanism. To manually operate this device it is only necessary to open the outlet box and pull the handle down sufficiently to break the seal or releasable connection 17, and to dislodge the ball 13 from the end of the tube 15. The ball will be dislodged as it strikes the dome 33 and causes the tube to pull out. The ball will then drop down onto seat 46 and close the gas supply pipe. The gas pressure within the valve chamber will then escape through tube 15 and serve as a tell-tale and indicate that the ball has operated to shut off the gas.

If the ball is released because of increase of temperature, the sealing wax will melt to release the ball which falls to seal the outlet 46.

The device is simple but effective for the purposes stated, and it may be readily installed at any suitable place within or without the house or compartment to be thus protected.

Having now described my invention, what I desire to secure by Letters Patent is:

1. In a gas shut-off valve, a valve body having an inlet and a valve seat surrounding said inlet, a ball for closing said inlet, a stem having a gas passage sealed into said ball and normally holding said ball away from its seat, and means for breaking the seal to release the ball and to open said gas passage.

2. A gas supply cut-off device comprising a valve body having a valve seat associated therewith and surrounding the inlet, a ball to fit on said seat for closing said inlet, a tube to normally hold the ball out of engagement with its seat, said tube having a sealed gas passage and means to break the seal for the gas passage and release the ball to close the inlet.

3. A gas supply cut-off device comprising a valve body having a valve seat associated therewith and surrounding the inlet, a ball to fit on said seat for closing said inlet, a tube to normally hold the ball out of engagement with its seat, said tube having a sealed gas passage and manually operated means for disengaging said ball from said tube and breaking the seal for the gas passage.

4. A gas supply cut-off device comprising a valve body having an inlet, a valve seat associated with said inlet, a normally inoperative gas cut-off means and by-pass means located in said valve body above said valve seat, and positive means for rendering operative said gas cut-off means and by-pass means.

5. A gas supply cut-off device comprising a valve body having an inlet opening and a valve seat associated therewith, a ball to fit on said seat for closing said gas supply, a tube to normally hold the ball disengaged from its seat, said tube having a normally sealed by-pass gas passage, a coupling in said body, a plug carried in said coupling for supporting said tube and gas cut-off ball above said seat, and means for moving said tube to break the by-pass seal and release the ball.

6. A gas supply cutoff device comprising a valve body, a gas supply pipe connected to said valve body and having a valve seat, a gas cutoff means, a normally closed by-pass means located in said valve body above said valve seat, said by-pass means normally holding said cutoff means open, and means for releasing said cutoff means from said by-pass means and for opening the by-pass means.

In testimony whereof I have hereunto set my hand on this 24th day of October A. D., 1925.

HENRY KENNELL.